US009632657B2

(12) United States Patent
Dong

(10) Patent No.: US 9,632,657 B2
(45) Date of Patent: Apr. 25, 2017

(54) AUXILIARY INPUT DEVICE

(71) Applicant: Changliu Dong, Shanghai (CN)

(72) Inventor: Changliu Dong, Shanghai (CN)

(73) Assignee: SAP SE, Walldorf (DE)

( * ) Notice: Subject to any disclaimer, the term of this patent is extended or adjusted under 35 U.S.C. 154(b) by 71 days.

(21) Appl. No.: 14/583,757

(22) Filed: Dec. 28, 2014

(65) Prior Publication Data

US 2016/0188154 A1 Jun. 30, 2016

(51) Int. Cl.
G06F 3/0481 (2013.01)
G06F 3/02 (2006.01)
G06F 3/0487 (2013.01)
G06F 1/16 (2006.01)
G06F 3/033 (2013.01)
G06F 3/038 (2013.01)
G06F 3/0485 (2013.01)

(52) U.S. Cl.
CPC .......... G06F 3/04812 (2013.01); G06F 1/163 (2013.01); G06F 3/0227 (2013.01); G06F 3/033 (2013.01); G06F 3/0383 (2013.01); G06F 3/0485 (2013.01); G06F 3/0487 (2013.01)

(58) Field of Classification Search
CPC ............... G06F 3/04812; G06F 3/0227; G06F 3/03547; G06F 3/038; G06F 3/0484; G06F 3/04845; G06F 3/04847; G06F 3/0485; G06F 3/048; G06F 3/0481; G06F 3/033; G06F 3/0383; G06F 1/163
USPC ......................................... 345/156, 157, 158
See application file for complete search history.

(56) References Cited

U.S. PATENT DOCUMENTS

| 6,225,976 B1 * | 5/2001 | Yates ...................... G06F 3/033 341/21 |
| 6,246,482 B1 * | 6/2001 | Kinrot ...................... G01D 5/26 356/499 |
| 6,424,335 B1 * | 7/2002 | Kim ...................... G06F 1/1616 345/158 |
| 6,535,198 B1 * | 3/2003 | Fan ........................ G08C 23/04 345/158 |
| 6,781,570 B1 * | 8/2004 | Arrigo ................... G06F 3/0317 345/156 |
| 6,925,611 B2 | 8/2005 | SanGiovanni |
| 8,238,894 B2 | 8/2012 | Louch et al. |
| 8,504,008 B1 | 8/2013 | Gossweiler, III et al. |
| 8,548,453 B2 | 10/2013 | Jeon et al. |
| 8,588,758 B2 | 11/2013 | Ullrich |
| 8,749,499 B2 | 6/2014 | Ameling et al. |
| 8,769,444 B2 | 7/2014 | Werner |
| 2002/0024675 A1 * | 2/2002 | Foxlin .................. G02B 27/017 356/620 |
| 2004/0017355 A1 * | 1/2004 | Shim ................... G06F 3/03547 345/157 |
| 2005/0128180 A1 * | 6/2005 | Wang .................... G06F 3/0231 345/156 |
| 2006/0109262 A1 * | 5/2006 | Yeh ...................... G06F 3/03545 345/179 |
| 2006/0143572 A1 | 6/2006 | Scott et al. |

(Continued)

Primary Examiner — Tom Sheng
(74) Attorney, Agent, or Firm — Horizon IP Pte. Ltd.

(57) ABSTRACT

Disclosed herein are technologies for providing an auxiliary input device. The auxiliary input device may provide data to a mobile host device. In some implementations, the auxiliary input device includes a photoelectric sensor that tracks movement and provides spatial data that manipulates a cursor displayed on a user interface of the mobile host device.

20 Claims, 2 Drawing Sheets

(56) References Cited

U.S. PATENT DOCUMENTS

| | | |
|---|---|---|
| 2006/0143580 A1* | 6/2006 | Gimness ............... G06F 3/0354 |
| | | 715/856 |
| 2007/0077784 A1 | 4/2007 | Kalayjian et al. |
| 2007/0103454 A1 | 5/2007 | Elias |
| 2009/0135141 A1* | 5/2009 | Chen .................... G06F 3/0304 |
| | | 345/166 |
| 2009/0179854 A1* | 7/2009 | Weber .................. G06F 1/1626 |
| | | 345/156 |
| 2010/0238111 A1 | 9/2010 | Chen et al. |
| 2011/0011925 A1* | 1/2011 | Yoshida ................. G08C 19/28 |
| | | 235/375 |
| 2011/0037695 A1* | 2/2011 | Bor ........................ G06F 3/033 |
| | | 345/158 |
| 2011/0246902 A1 | 10/2011 | Tsai et al. |
| 2012/0066643 A1 | 3/2012 | McRae |
| 2012/0235900 A1* | 9/2012 | Border .................... G02B 5/23 |
| | | 345/156 |
| 2013/0076623 A1* | 3/2013 | Abrams ................. G06F 3/033 |
| | | 345/157 |
| 2013/0278552 A1 | 10/2013 | Kamin-Lyndgaard |
| 2013/0346636 A1 | 12/2013 | Bathiche et al. |
| 2015/0212598 A1* | 7/2015 | Lee ..................... G06F 3/03543 |
| | | 345/166 |

\* cited by examiner

AUXILIARY INPUT DEVICE

TECHNICAL FIELD

The present disclosure generally relates to auxiliary input devices.

BACKGROUND

Wearable devices are increasingly used in personal and business fields. Wearable devices generally refer to clothing and accessories that incorporate advanced computing and electronic technology. One much noted example is Google Glass, which is a type of wearable technology with an optical head-mounted display. Other types of wearable devices include smart watches, smart shirts, smart jewelry and so forth.

Users of wearable devices typically use natural language voice commands as a primary input method. However, voice commands are not practical in many scenarios. For example, users who are mute or hearing impaired are not able to use voice commands to interface with the wearable devices. In addition, it is very difficult, if not impossible, to navigate the user interface display of the wearable device by using voice commands Other navigation methods, such as a touchscreen pointer, may not be feasible due to the very small size of the user interface display.

SUMMARY

The present disclosure generally relates to an auxiliary input framework. In accordance with one aspect, an auxiliary input device includes a wireless communication device and a housing. The wireless communications device enables wireless communication with a mobile host device via a communication channel. The housing may include front and back surfaces and at least first and second side surfaces, wherein the front surface includes first and second buttons. The first button may track movement and provide spatial data that manipulates a cursor displayed on a user interface of the mobile host device. The first and second side surfaces may include respective third and fourth buttons, where the third and fourth buttons are mapped to identical functions for manipulating elements of the user interface.

In accordance with another aspect, a method of data input is provided. The method may include displaying a cursor on a user interface on a mobile host device, moving the cursor in response to movement tracked by a photoelectric sensor in a first button of an auxiliary input device, and performing a function, via the user interface, in response to activation of a touch switch in a second button or third button of the auxiliary input device, wherein the second and third buttons are located on first and second side surfaces of the auxiliary input device and are mapped to identical functions.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings. Furthermore, it should be noted that the same numbers are used throughout the drawings to reference like elements and features.

DETAILED DESCRIPTION

Figure 1:
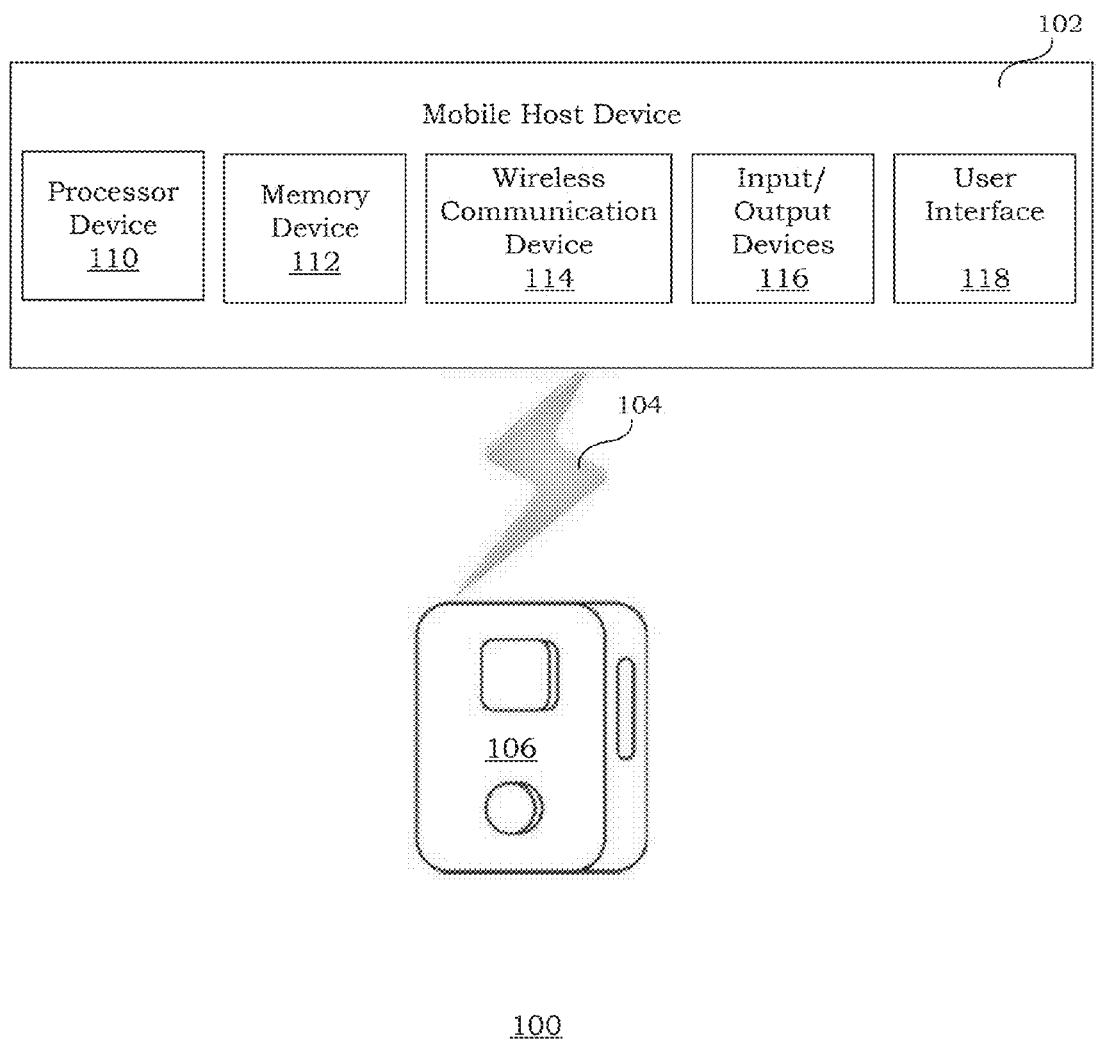
FIG. 1 shows an exemplary computing system.

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The present disclosure generally describes an auxiliary input device that provides data to a mobile host device. The mobile host device may be a wearable device or any other mobile device. In some implementations, the auxiliary input device includes a photoelectric tracking component that detects movement over the component and provides spatial data in response thereof. These and other exemplary features and advantages will be more apparent in the following description.

FIG. 1 shows an exemplary computing system 100 for implementing a method and system of the present disclosure. The present technology may be implemented in various forms of hardware, software, firmware, special purpose processors, or a combination thereof, either as part of the microinstruction code or as part of an application program or software product, or a combination thereof, which is executed via the operating system.

Computing system 100 includes a mobile host device 102 that can be communicatively coupled with an auxiliary input device 106. In some implementations, mobile host device 102 is a handsfree wearable device, such as a wearable computer integrated with a front facing video camera and an optical head-mounted display (e.g., Google Glass), wearable smart watch, wearable clothing, wearable jewelry, etc. Mobile host device 102 may also be a handheld computing device, such as a smartphone, mobile phone, tablet computer, laptop, portable media player, personal digital assistant, handheld game console, personal navigation device, digital camera, etc. Other types of portable devices are also useful.

Mobile host device 102 may include a processor device 110, non-transitory computer-readable media or memory device 112, a wireless communication device 114, one or more user input and/or output devices 116 (e.g., keyboard, touchscreen, voice recognition module, camera, microphone, speaker, etc.), a user interface 118, etc. Other components (not shown), such as a power supply, clock circuits, internal bus, etc., may also be included.

Memory device 112 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof. In some implementations, memory device 112 includes an operating system and run various types of application software. Memory device 112 may also store driver software that can be executed by processor device 110 to interface with and interpret data provided by auxiliary input device 106.

Wireless communication device 114 may include hardware and/or software to enable the mobile host device 102 to communicate wirelessly with auxiliary input device 106 and various external components via a communication channel 104. The communication channel 104 may be facilitated by any type of communication scheme that allows devices to exchange data. For example, the communication channel 104 may be implemented by any of a plurality of data exchange protocols, such as Bluetooth, Wi-Fi, near-field communication (NFC), infrared communication, global positioning system (GPS), TCP/IP, Ethernet, WAP, IEEE 802.11, proprietary protocols or any other protocols. Implementations are contemplated in which the mobile host device 102 enables a user to access a shared public infrastructure (e.g., Internet), an extranet, an intranet, a virtual private network ("VPN"), a local area network (LAN), a wide area network (WAN), P2P, a wireless communications network, telephone network, facsimile network, cloud network or any combination thereof.

User interface 118 may include hardware and/or software that enables a user to interface with the mobile host device 102. In some implementations, user interface 118 is a graphical user interface. Text-based user interfaces are also useful. User interface 118 includes various user interface elements (e.g., buttons, lists, text, graphics, etc.) that may be manipulated by using auxiliary input device 106. A cursor is automatically displayed on the screen of the user interface 118 in response to the establishment of a communication channel between the auxiliary input device 106 and the mobile host device 102. The cursor may be manipulated via auxiliary input device 106.

Auxiliary input device 106 may include a wireless communications device to enable wireless communication with mobile host device 102 via communication channel 104. Auxiliary input device 106 may further include a processor device and a memory device for storing driver software that is executable by the processor device. In some implementations, driver software on both the mobile host device 102 and the auxiliary input device 106 is executed to pair the devices (102, 106) when the auxiliary input device 106 is within the range of the mobile host device 102. For example, if the devices (102, 106) are NFC-enabled, the auxiliary input device 106 may connect to, or disconnect from, the mobile host device 102 when the devices (102, 106) are within a predetermined distance range.

Auxiliary input device 106 may serve as a primary input device of the mobile host device 102. Alternatively, auxiliary input device 106 may serve as a secondary input device that supplements a primary input device (e.g., voice command module). Auxiliary input device 106 includes various buttons that are mapped to various functions for manipulating the elements of the user interface 118 after connection is established between the auxiliary input device 106 and the mobile host device 102.

Figure 2:
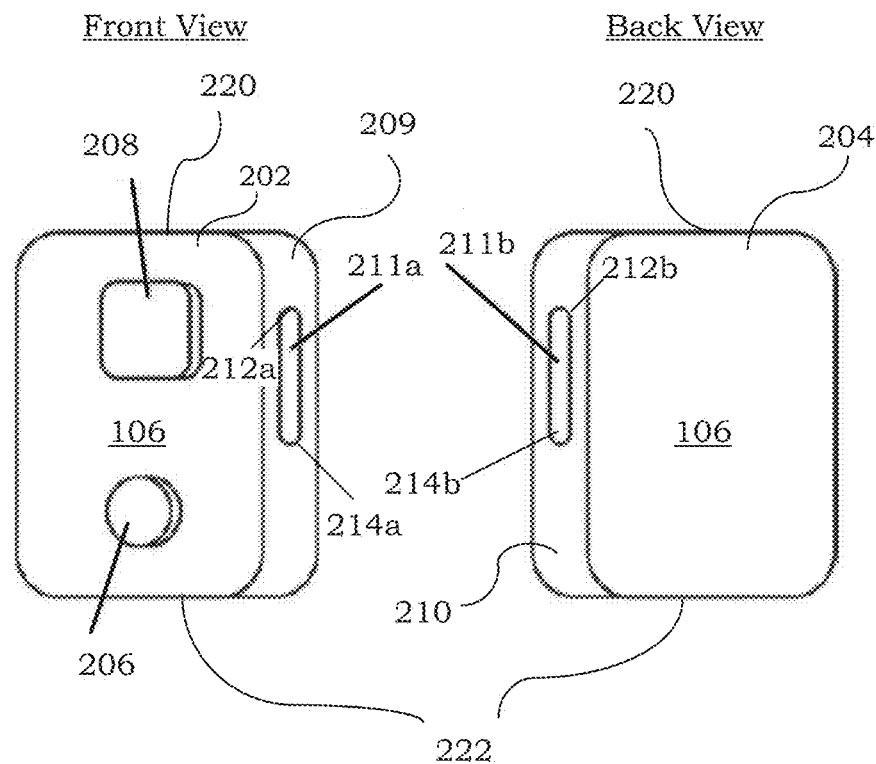
FIG. 2 shows an exemplary auxiliary input device.

FIG. 2 shows the front and back views of a housing of an exemplary auxiliary input device 106. In some implementations, the housing of the auxiliary input device is shaped as a box. Other shapes, such as round, oval or ergonomic shape that fits well in the hand, are also possible. The housing of the auxiliary input device 106 includes a front surface 202, a back surface 204, first and second side surfaces (209 and 210), and third and fourth side surfaces (220 and 222). In some implementations, the first and second side surfaces (209 and 210) are parallel to each other, while the third and fourth side surfaces (220 and 222) are parallel to each other. Other configurations are also possible. The size of the auxiliary input device 106 is generally small enough to allow it to be held in one hand by the user. For example, the size may be smaller than a typical adult human hand. The user may advantageously operate the auxiliary input device 106 with one hand without placing it on a surface (e.g., table top). The user may also operate the auxiliary input device 106 while it is contained in, for example, a pocket.

The front surface (202) may include a first button 206 and a second button 208. In some implementations, the first button 206 includes a photoelectric sensor that detects or tracks movement on or over the first button and provides spatial data in response thereto to manipulate (e.g., move left, right, up or down) the cursor displayed on the user interface 118 of mobile host device 102. The first button 206 may also include a touch switch that is activated by applying pressure on it.

The driver software in the mobile host device 102 may be executed by the processor device 110 to manipulate the cursor and other elements displayed on the user interface 118 in response to spatial data received from the auxiliary input device 106. In some implementations, the cursor moves when a user's finger slides on the first button 206. When the cursor reaches the edge of the display area of the user interface 118, the cursor may move out-of-sight content into sight in response to the manipulation of the first button 206. To perform a click operation or select an element of the user interface 118 where the cursor is currently pointing at, the user may press or apply pressure on the first button 206 to activate it. To activate a context menu on the user interface 118 or perform any other click and hold operation, the user may press and hold the first button 206 for a specified period of time and with a minimum specified force. When the user's finger hovers around or on the first button 206, the area of the user interface 118 where the cursor is currently pointing at may be magnified (or zoomed in).

In some implementations, the second button 208 includes a touch switch that is mapped to multiple functions to manipulate the elements of the user interface 118. In some implementations, the user may apply pressure on the second button 208 to activate it and cause the user interface to return or rollback from the current state to a previous state (e.g., display previous screen). The user may also press it two times within a predetermined time period to display a home screen of the user interface 118. To display a multitasking screen, the user may press and hold the second button 208 for a specified period of time and with a minimum specified force. The multitasking screen enables the user to quit applications that the user no longer desires to run, and to switch between open applications.

The first and second side surfaces (209 and 210) each has a third button (211a) and fourth button (211b) respectively.

The third and fourth buttons (211a-b) may be mapped to identical functions. This advantageously allows the user to use either the left or the right hand to operate the auxiliary input device 106. In some implementations, either the third button 211a or the fourth button 211b may be deactivated to avoid accidental operation. The deactivation may be performed via, for example, a configuration setting in the driver software.

In some implementations, the third and fourth buttons (211a-b) each includes a first touch switch (212a-b) and second touch switch (214a-b). The respective first and second touch switches (212a-b and 214a-b) may be located at opposite ends of the respective button. First and second touch switches (212a-b and 214a-b) are mapped to opposite functions. For example, first touch switch (212a or 212b) may be mapped to a zoom-in function (i.e., increase zoom factor) while second touch switch (214a or 214b) may be mapped to a zoom-out function (i.e., reduce zoom factor). Alternatively, first touch switch (212a or 212b) may be mapped to a volume-up function while second touch switch (214a or 214b) may be mapped to a volume-down function. Accordingly, the user may press either first or second touch switch component (212a-b or 214a-b) to control the zoom factor or speaker volume of the user interface 118. Other types of functions may also be provided. The pairs of opposite functions (e.g., zooming, volume control, etc.) may be dynamically selected and mapped based on the contextual information displayed by the user interface 118.

While the present invention has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

The invention claimed is:

1. An auxiliary input device, comprising:
a wireless communications device that enables wireless communication with a wearable device that includes a user interface; and
a handheld housing including front and back flat surfaces and at least first and second side surfaces, wherein the front flat surface includes first and second buttons, wherein the first button comprises a photoelectric component that tracks movement and provides spatial data that manipulates a cursor displayed on the user interface, wherein the second button is a touch switch component that provides multiple functions to manipulate elements of the user interface, wherein the first and second side surfaces comprise respective third and fourth buttons that are mapped to identical functions for manipulating elements of the user interface.

2. The method of claim 1 wherein the wearable device comprises an optical head-mounted display.

3. An auxiliary input device, comprising:
a wireless communications device that enables wireless communication with a mobile host device via a communication channel, wherein the mobile host device includes a user interface; and
a handheld housing including front and back flat surfaces and at least first and second side surfaces, wherein the front flat surface comprises first and second buttons, wherein the first button tracks movement and provides spatial data that manipulates a cursor displayed on the user interface, wherein the first and second side surfaces comprise respective third and fourth buttons that are mapped to identical functions for manipulating elements of the user interface.

4. The auxiliary input device of claim 3 wherein the communication channel comprises a Bluetooth, Wi-Fi or near-field communication (NFC) channel.

5. The auxiliary input device of claim 3 wherein the mobile host device comprises a wearable device.

6. The auxiliary input device of claim 3 wherein the mobile host device comprises a handheld computing device.

7. The auxiliary input device of claim 3 wherein the handheld housing has a box shape.

8. The auxiliary input device of claim 3 wherein the first button comprises aphotoelectric sensor.

9. The auxiliary input device of claim 8 wherein the second button comprises a touch switch that is activated by applying pressure.

10. The auxiliary input device of claim 3 wherein an area of the user interface is magnified in response to a user's finger hovering around or on the first button.

11. The auxiliary input device of claim 3 wherein the user interface returns to a previous state in response to a user activating the second button.

12. The auxiliary input device of claim 3 wherein the second button comprises a touch switch that is mapped to multiple functions to manipulate elements of the user interface.

13. The auxiliary input device of claim 12 wherein the user interface displays a multitasking screen in response to a user pressing and holding the second button, wherein the multitasking screen enables the user to quit or switch between open applications.

14. The auxiliary input device of claim 3 wherein the third and fourth buttons each includes first and second touch switches.

15. The auxiliary input device of claim 14 wherein the first and second touch switches are mapped to opposite functions.

16. The auxiliary input device of claim 15 wherein the opposite functions are dynamically selected based on context of the user interface.

17. The auxiliary input device of claim 3 wherein the first and second side surfaces are parallel to each other.

18. A method of data input, comprising:
displaying a cursor on a user interface on a mobile host device;
moving the cursor in response to movement tracked by a photoelectric sensor in a first button located on a front flat surface of an auxiliary input device operated while contained in a pocket; and
performing a function, via the user interface, in response to activation of a touch switch in a second button or third button of the auxiliary input device, wherein the second and third buttons are located on first and second side surfaces of the auxiliary input device and are mapped to identical functions for manipulating elements of the user interface.

19. The method of claim 18 further comprising dynamically mapping the second and third buttons to the identical functions based on contextual information displayed by the user interface.

20. The method of claim 19 wherein dynamically mapping the second and third buttons to the identical functions comprises mapping first and second touch switches of each of the second and third buttons to zoom-in and zoom-out functions.

* * * * *